United States Patent
Iwata (10) Patent No.: US 8,212,525 B2
(45) Date of Patent: Jul. 3, 2012

(54) BATTERY PACK AND METHOD OF CONTROLLING THE SAME

(75) Inventor: Shigeki Iwata, Fukushima (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/617,928

(22) Filed: Nov. 13, 2009

(65) Prior Publication Data

US 2010/0123434 A1    May 20, 2010

(30) Foreign Application Priority Data

Nov. 18, 2008    (JP) .................................. 2008294333

(51) Int. Cl.
*H02J 7/00* (2006.01)

(52) U.S. Cl. ........ 320/118; 320/132; 320/134; 320/136; 320/164

(58) Field of Classification Search .................... 320/118
See application file for complete search history.

(56) References Cited

U.S. PATENT DOCUMENTS

| | | | | |
|---|---|---|---|---|
| 5,977,750 | A * | 11/1999 | Ng et al. ........................ | 320/132 |
| 6,114,836 | A * | 9/2000 | Hagiwara et al. ............. | 320/132 |
| 7,579,811 | B2 * | 8/2009 | Sato et al. ..................... | 320/134 |
| 7,693,671 | B2 * | 4/2010 | Okumura et al. .............. | 702/63 |
| 2007/0145949 | A1 * | 6/2007 | Matsushima et al. ......... | 320/132 |
| 2007/0170893 | A1 * | 7/2007 | Kao et al. ...................... | 320/132 |
| 2008/0164848 | A1 * | 7/2008 | Sakurai et al. ................ | 320/136 |
| 2008/0258686 | A1 * | 10/2008 | Li et al. .......................... | 320/134 |
| 2008/0272736 | A1 * | 11/2008 | Tien et al. ..................... | 320/126 |
| 2009/0027056 | A1 * | 1/2009 | Huang et al. .................. | 324/439 |
| 2009/0128094 | A1 * | 5/2009 | Okuto ............................ | 320/134 |
| 2009/0160407 | A1 * | 6/2009 | Hwang .......................... | 320/157 |
| 2009/0266631 | A1 * | 10/2009 | Kikuchi ................... | 180/65.265 |

FOREIGN PATENT DOCUMENTS

JP    2007335337    12/2007

* cited by examiner

*Primary Examiner* — Arun Williams
(74) *Attorney, Agent, or Firm* — K&L Gates LLP (57) ABSTRACT

A battery pack includes: a secondary battery formed by connecting a plurality of battery cells in series; a control section measuring a voltage at each of the battery cells and controlling each part according to the measurement result; a charge/discharge control circuit temporarily inhibiting charging and discharging of the secondary battery under control of the control section; an interruption circuit interrupting charge and discharge currents of the secondary battery under control of the control section to inhibit charging and discharging of the secondary battery permanently; a discharge circuit discharging a predetermined battery cell among the battery cells under control of the control section; a capacity measuring section measuring the amount of electricity discharged from the battery cell; and a storage section storing total discharge amount information indicating a total amount of discharged electricity and a charge/discharge inhibition record indicating a count of temporary charge/discharge inhibitions imposed on the secondary battery.

7 Claims, 4 Drawing Sheets

BATTERY PACK AND METHOD OF CONTROLLING THE SAME

CROSS REFERENCES TO RELATED APPLICATIONS

The present application claims priority to Japanese Priority Patent Application JP 2008-294333 filed in the Japan Patent Office on Nov. 18, 2008, the entire contents of which is hereby incorporated by reference.

BACKGROUND

The present application relates to a battery pack inhibited from being charged or discharged depending on the degree of deterioration of each secondary battery included therein and a method of controlling the battery pack.

Recently, portable electronic apparatus such as notebook type PCs (personal computers), portable telephones, and digital cameras have spread, and lithium ion secondary batteries are widely used as power sources for such apparatus because of their advantages such as high outputs, high energy densities, compactness, and small weights.

Lithium ion secondary batteries have high energy densities when compared to other types of secondary batteries utilizing, for example, nickel/cadmium or nickel/hydrogen. It is therefore very important to keep such batteries at a sufficient level of safety. For this reason, a battery pack utilizing lithium ion secondary batteries includes a protection circuit for inhibiting charging or discharging to prevent over-charging, over-discharging, or an over-current.

However, it is inappropriate to say that a battery pack can be kept at a sufficient level of safety by such a protection circuit alone, for example, when lithium ion secondary batteries therein have deteriorated as a result of the operation of the battery pack.

It is generally known that deterioration of a lithium ion secondary battery proceeds as a result of repeated charging and discharging and that the deterioration consequently increases the internal resistance of the secondary battery. When the internal resistance of a secondary battery increases as a result of deterioration, the battery undergoes a significant voltage drop corresponding to the increase in the internal resistance, and the capacity of the battery is therefore reduced even if charging conditions are kept unchanged.

Let us now assume that a plurality of secondary batteries (battery cells) are connected in series in a battery pack. When the battery pack having a plurality of battery cells connected in series is repeatedly charged and discharged, each of the battery cells undergoes deterioration, and the degree of deterioration may vary between the battery cells. When the battery cells have different battery capacities because of different degrees of deterioration between the battery cells, what is called battery balance is lost. Then, a battery cell which has deteriorated to a significantly high level compared to the other battery cells may be at an undesirably low level of safety. In such a case, it is desirable to take measures such as interrupting charging or discharging of the battery pack in consideration to safety of a user.

For example, Patent Document 1 (JP-A-2007-335337) discloses a technique for detecting the state of cell balance between a plurality of battery packs used in a power supply apparatus and inhibiting charging or discharging when it is determined that cell balance has been lost

SUMMARY

Normally, a user may stop using a battery pack based on recognition of the deterioration of the battery cells used in the battery pack in situations such as when the serviceable time of the battery pack becomes significantly short as a result of repeated charging and discharging.

However, depending on the degree of deterioration, the serviceable time of a battery pack may not become significantly short even though the safety of the battery pack has become low. Then, the user may continue using the battery pack without recognizing deterioration of the battery cells, and a dangerous situation may therefore arise. In such a case, battery packs according to the related art have had a problem in that they cannot be forcibly inhibited from being charged or discharged.

According to the above-cited Patent Document 1, control is exercised to inhibit charging and discharging based on the degree of deterioration of a battery pack as a whole. However, charging and discharging cannot be inhibited according to the degree of deterioration of each of plural battery cells used in a battery pack.

In some recent battery packs, a setting is made to inhibit charging or discharging based on a determination that battery cells have deteriorated to an undesirably low level of safety in situations such as when the number of charging/discharging cycles has exceeded a preset value. However, such battery packs cannot be inhibited from being charged or discharged when the level of safety becomes undesirably low before the preset number of charging/discharging cycles is reached.

It is therefore desirable to provide a battery pack which can be forcibly inhibited from being charged or discharged according to the degree of deterioration of each of plural battery cells used therein and to provide a control method for such a battery pack.

According to an embodiment, there is provided a battery pack including:

a secondary battery formed by connecting a plurality of battery cells in series;

a control section measuring a voltage at each of the plurality of battery cells and controlling each part according to the result of the measurement;

a charge/discharge control circuit temporarily inhibiting charging and discharging of the secondary battery under control exercised by the control section;

an interruption circuit interrupting charge and discharge currents of the secondary battery under control exercised by the control section to inhibit charging and discharging of the secondary battery permanently;

a discharge circuit discharging a predetermined battery cell among the plurality of battery cells under control exercised by the control section;

a capacity measuring section measuring the amount of electricity discharged from the battery cell at the discharge circuit; and a storage section storing total discharge amount information indicating a total amount of discharged electricity measured by the capacity measuring section and a charge/discharge inhibition record indicating a count of temporary charge/discharge inhibitions imposed on the secondary battery by the charge/discharge control circuit.

First and second thresholds for determining the safety of the secondary battery are set in association with the value of the total amount of discharged electricity indicated by the total discharge amount information and the count of temporary charge/discharge inhibitions indicated by the charge/discharge inhibition record.

The control section determines the state of cell balance between the plurality of battery cells based on the result of the measurement, performs a leveling process to achieve a proper cell balance by controlling the discharge circuit to discharge a battery cell having a high voltage among the plurality of battery cells when it is determined that the cell balance has been lost, and updates the total discharge amount information based on the amount of discharged electricity measured by the capacity measuring section.

The control section compares the total amount of discharged electricity indicated by the total discharge amount information stored in the storage section with the first threshold, controls the charge/discharge control circuit to inhibit charging and discharging of the secondary battery temporarily when it is determined that the total amount of discharged electricity is in the excess of the first threshold as a result of the comparison, and updates the charge/discharge inhibition record.

The control section compares the count of temporary charge/discharge inhibitions indicated by the charge/discharge inhibition record stored in the storage section with the second threshold and controls the interruption circuit to inhibit charging and discharging of the secondary battery permanently when it is determined that the count of temporary charge/discharge inhibitions is in the excess of the second threshold as a result of the comparison.

According to another embodiment, there is provided a control method including the steps of:

measuring a voltage at each of a plurality of series-connected battery cells of a secondary battery and controlling each part according to the result of the measurement;

measuring the amount of electricity discharged from a predetermined battery cell among the plurality of battery cells through a discharge circuit for discharging the battery cells;

storing total discharge amount information indicating a total amount of discharged electricity measured by at the capacity measuring step and a charge/discharge inhibition record indicating a count of temporary charge/discharge inhibitions imposed on the secondary battery by a charge/discharge control circuit for temporarily inhibiting charging and discharging of the secondary battery in a storage section.

First and second thresholds for determining the safety of the secondary battery are set in association with the value of the total amount of discharged electricity indicated by the total discharge amount information and the count of temporary charge/discharge inhibitions indicated by the charge/discharge inhibition record.

The control step includes the step of determining the state of cell balance between the plurality of battery cells based on the result of the measurement, performing a leveling process to achieve a proper cell balance by controlling the discharge circuit to discharge a battery cell having a high voltage among the plurality of battery cells when it is determined that the cell balance has been lost, and updating the total discharge amount information based on the amount of discharged electricity measured at the capacity measuring step.

The control step also includes the step of comparing the total amount of discharged electricity indicated by the total discharge amount information stored in the storage section with the first threshold, controlling the charge/discharge control circuit to inhibit charging and discharging of the secondary battery temporarily when it is determined that the total amount of discharged electricity is in the excess of the first threshold as a result of the comparison, and updating the charge/discharge inhibition record.

The control step further includes the step of comparing the count of temporary charge/discharge inhibitions indicated by the charge/discharge inhibition record stored in the storage section with the second threshold and permanently inhibiting charging and discharging of the secondary battery by controlling an interruption circuit which interrupts charge and discharge currents of the secondary battery to inhibit charging and discharging of the secondary battery permanently, when it is determined that the count of temporary charge/discharge inhibitions is in the excess of the second threshold as a result of the comparison.

As described in the above, according to the embodiments of the invention, a voltage at each of a plurality of series-connected battery cells of a secondary battery is measured, and each part is controlled according to the result of the measurement. The amount of electricity discharged from a predetermined battery cell among the plurality of battery cells is measured, the electricity being discharged through a discharge circuit for discharging the battery cells.

Total discharge amount information indicating a total amount of discharged electricity measured by at the capacity measuring step and a charge/discharge inhibition record indicating a count of temporary charge/discharge inhibitions imposed on the secondary battery by a charge/discharge control circuit for temporarily inhibiting charging and discharging of the secondary battery is stored in a storage section. First and second thresholds for determining the safety of the secondary battery are set in association with the value of the total amount of discharged electricity indicated by the total discharge amount information and the count of temporary charge/discharge inhibitions indicated by the charge/discharge inhibition record. The state of cell balance between the plurality of battery cells is determined based on the result of the measurement, and a leveling process to achieve a proper cell balance is performed by controlling the discharge circuit to discharge a battery cell having a high voltage among the plurality of battery cells when it is determined that the cell balance has been lost. The total discharge amount information is updated based on the amount of discharged electricity measured at the capacity measuring step. The total amount of discharged electricity indicated by the total discharge amount information stored in the storage section is compared with the first threshold, and the charge/discharge control circuit is controlled to inhibit charging and discharging of the secondary battery temporarily when it is determined that the total amount of discharged electricity is in the excess of the first threshold as a result of the comparison. The charge/discharge inhibition record is updated accordingly. The count of temporary charge/discharge inhibitions indicated by the charge/discharge inhibition record stored in the storage section is compared with the second threshold, and charging and discharging of the secondary battery is permanently inhibited by controlling an interruption circuit which interrupts charge and discharge currents of the secondary battery to inhibit charging and discharging of the secondary battery permanently, when it is determined that the count of temporary charge/discharge inhibitions is in the excess of the second threshold as a result of the comparison. It is therefore possible to avoid dangerous situations resulting from the progress of deterioration of a battery pack to keep the battery pack at safety.

According to the embodiments of the invention, the state of cell balance between a plurality of battery cells is determined, and a leveling process for keeping the cell balance properly by discharging a battery cell having a high voltage among the plurality of battery cells when it is determined that cell balance has been lost. A total discharging capacity value stored in a storage section is compared with a first threshold, and charging or discharging of secondary batteries is temporarily inhibited when it is determined that the total discharging capacity value is in the excess of the first threshold. Further, a count of temporary charge/discharge inhibitions stored in the storage section is compared with a second threshold, and the flow of charging and discharging currents to the secondary batteries is interrupted to inhibit charging and discharging of the secondary batteries permanently when it is determined that the count of temporary charge/discharge inhibitions is in the excess of the second threshold. The embodiments are therefore advantageous in that a dangerous state attributable to progress of deterioration of a battery pack can be avoided to keep a sufficient level of safety.

Additional features and advantages are described herein, and will be apparent from the following Detailed Description and the figures.

DETAILED DESCRIPTION

An embodiment will now be described with reference to the drawings. The present embodiment involves a process of determining the state of cell balance between a plurality of series-connected battery cells of a battery pack and discharging the battery cells according to the result of the determination to keep the cell balance properly. When the cell balance cannot be properly kept, charging and discharging is temporarily inhibited based on the amount of electricity discharged. Charging and discharging may be permanently inhibited depending on the number of times charging and discharging has been temporarily inhibited.

[Battery Pack Configuration]

Figure 1:
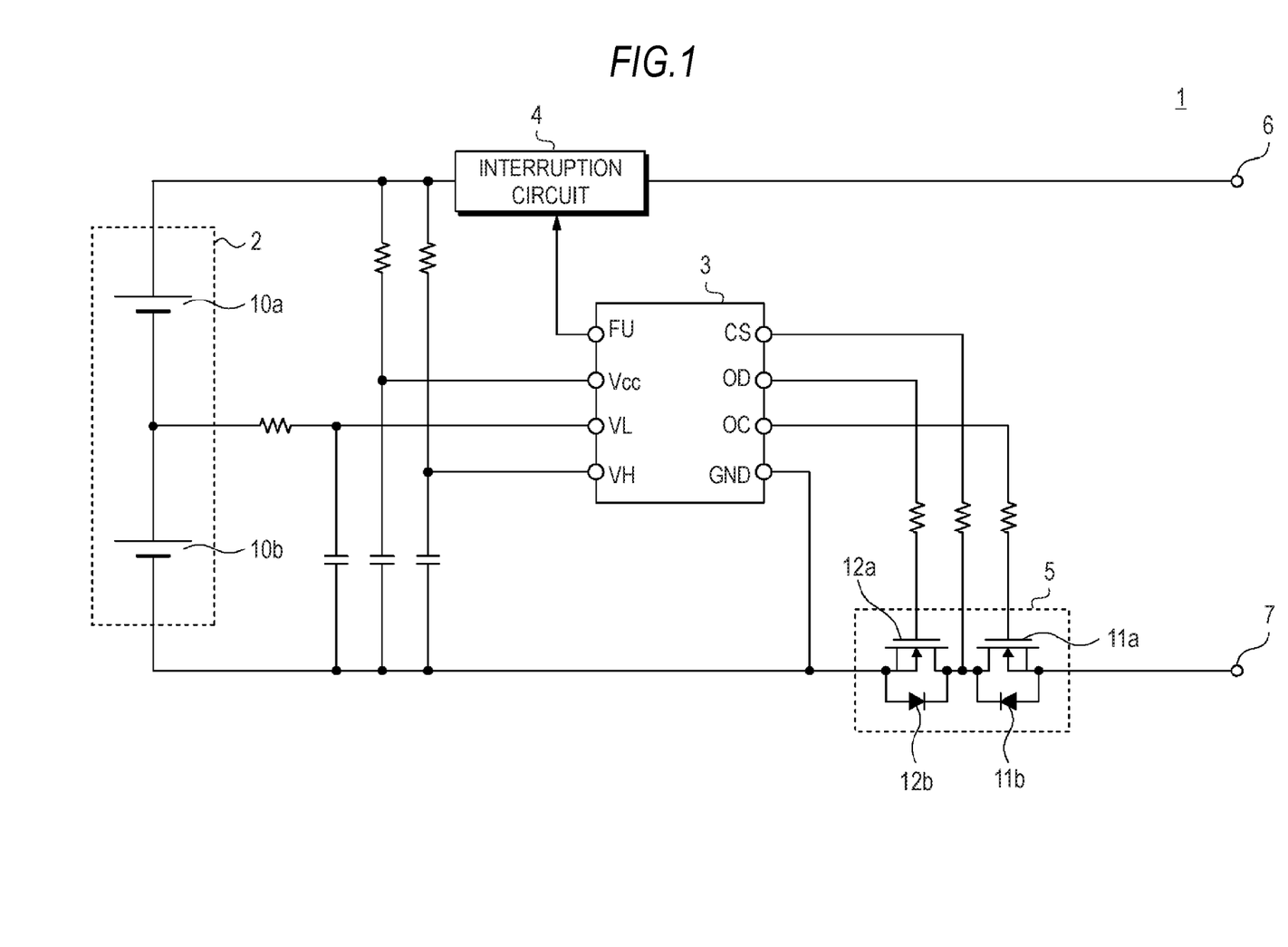
FIG. 1 is a block diagram showing an exemplary configuration of a battery pack according to an embodiment.

FIG. 1 shows an exemplary configuration of a battery pack 1 according to an embodiment. The illustration and description of the example will omit parts other than those associated with the present embodiment in order to avoid complication of the description. The battery pack 1 is discharged by connecting a positive terminal 6 and a negative terminal 7 thereof to a positive terminal and a negative terminal of an external electronic apparatus, respectively, when it is used in the electronic apparatus. When the battery pack is charged, it is mounted on a charger, and the positive terminal 6 and the negative terminal 7 are connected to a positive terminal and a negative terminal of the charger, respectively, in the same way as done when the battery pack is used in the electronic apparatus.

Major parts forming the battery pack 1 include a secondary battery 2, a control section 3, an interruption circuit 4, and a switch circuit 5. The secondary battery 2 is a secondary battery such as a lithium ion battery which is formed by connecting a plurality of battery cells, e.g., battery cells 10a and 10b, in series.

For example, the control section 3 is constituted by an IC (integrated circuit). The IC is provided with terminals FU, Vcc, VL, VH, CS, OD, OC, and GND. The terminal FU is a terminal which is connected to the interruption circuit 4 to output an interruption control signal for controlling the operation of the interruption circuit 4. The terminal Vcc is a terminal to which power for driving the IC serving as the control section 3 is supplied. The terminal VL is a terminal which is connected between the battery cell 10a and the battery cell 10b to measure a voltage V2 at the battery cell 10b. The terminal VH is a terminal which is connected to a positive terminal of the secondary battery 2 to measure the voltage of the secondary battery 2. The terminal CS is a terminal connected between a charge control FET (field effect transistor) 11a and a discharge control FET 12a provided in the switch circuit 5 which will be described later, and the terminal is used to protect the secondary battery 2 against an over-current by detecting the discharge current. The terminal OD is a terminal connected to a gate terminal of the discharge control FET 12a to output a discharge control signal for controlling the operation of the discharge control FET 12a. The terminal OC is a terminal connected to a gate terminal of the charge control FET 11a to output a charge control signal for controlling the operation of the charge control FET 11a. The terminal GND is a terminal connected between the negative terminal of the secondary battery 2 and the switch circuit 5 to measure the ground potential of the secondary battery 2.

The control section 3 measures a voltage at each of the battery cells 10a and 10b of the secondary battery 2. The control section 3 controls the switch circuit 5 which will be described later based on the voltages thus measured. For example, the section turns the switch circuit 5 off to prevent over-charging when the voltage of either battery cell reaches an over-charging detection voltage and to prevent over-discharging when the voltage equals or falls bellow an over-discharging detection voltage.

The control section 3 also determines the state of cell balance between the battery cells 10a and 10b based on the results of voltage measurement at the battery cells 10a and 10b. When it is determined that the cell balance between the battery cells has been lost from the result of the determination, the section performs a leveling process to achieve a proper cell balance. The section controls the interruption circuit 4 and the switch circuit 5 based on the result of the process. Details of the control section 3 will be described later.

Figure 2:
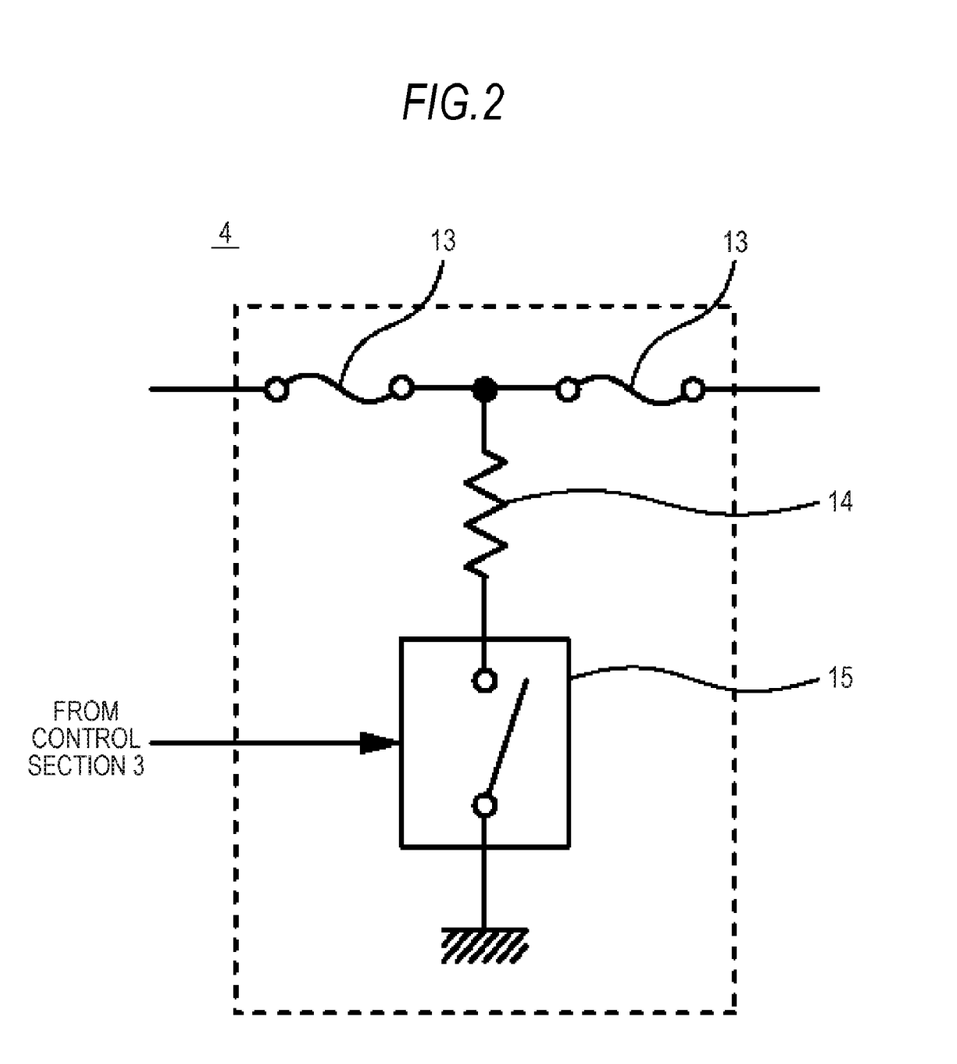
FIG. 2 is a block diagram showing an exemplary configuration of an interruption circuit.

The interruption circuit 4 interrupts paths for charging and discharging the secondary battery 2 under control exercised by the control section 3. For example, the interruption circuit 4 includes fuses 13, a heater resistor 14, and a switching element 15 as shown in FIG. 2, and the fuses 13 are proved in series connection with the secondary battery 2. When an over-current flows through the secondary battery 2, the fuses 13 are blown by heat generated by the over-current to interrupt the paths for charging and discharging the secondary battery 2.

For example, when the cell balance between the battery cells is lost, the switching element 15 is turned on under control exercised by the control section 3 to form a path for allowing a current to flow from the secondary battery 2 to the fuses 13 and the heater resistor 14. Heat is generated at the heater resistor 14 by the current flowing through the same at this time. The temperature of the fuses 13 is increased by the heat from the heater resistor 14, and the fuses 13 are blown when a blowing temperature is reached, whereby the paths for charging and discharging the secondary battery 2 are interrupted.

For example, a switch having mechanical contacts or an electrical switch such as an FET may be used as the switching element 15. The interruption circuit 4 is not limited to the example described herein, and other types of interruption circuits may be used.

Referring to FIG. 1 again, the switch circuit 5 is formed by the charge control FET 11a and the discharge control FET 12a. When the battery voltage reaches the over-charging detection voltage, the charge control FET 11a is turned off or controlled to disallow the charge current to flow based on the charge control signal from the control section 3. After the charge control FET 11a is turned off, only discharging can take place through a parasitic diode 11b.

When the battery voltage falls down to the over-discharge detection voltage, the discharge control FET 12a is turned off or controlled to disallow the discharge current to flow based on the discharge control signal from the control section 3. After the discharge control FET 12a is turned off, only charging can take place through a parasitic diode 12b.

Figure 3:
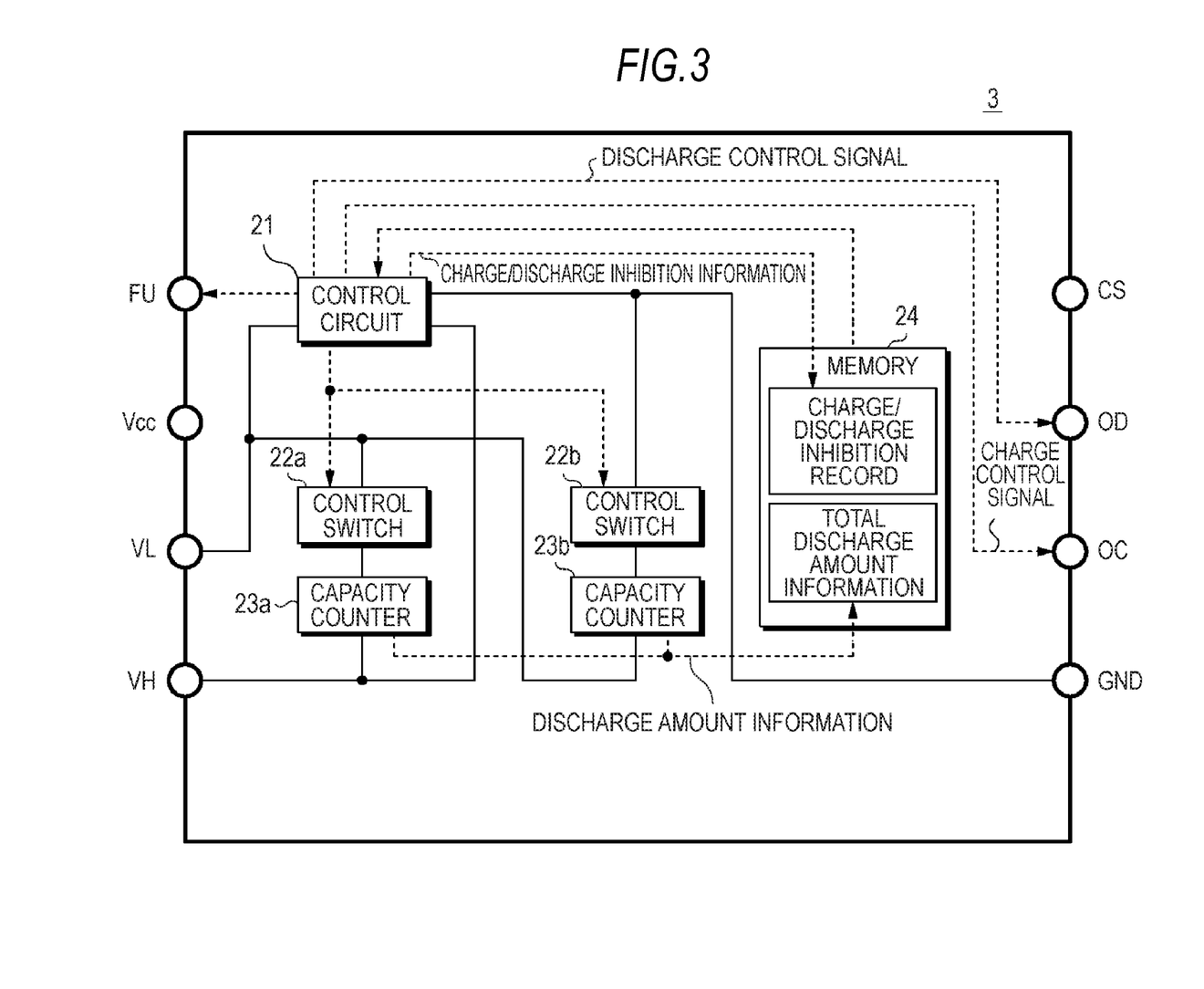
FIG. 3 is a block diagram showing an exemplary configuration of a control section.

FIG. 3 shows an exemplary configuration of the control section 3. In FIG. 3, paths allowing currents to flow actually are represented by solid lines, and various types of control signals are represented by dotted lines. The control section 3 includes a control circuit 21, control switches 22a and 22b, capacity counters 23a and 23b, and a memory 24.

The control circuit 21 controls each part of the section according to a program stored in advance in a ROM (read only memory) which is not shown using a RAM (random access memory), which is not shown, as a work memory. The control circuit 21 measures the voltages at the battery cells 10a and 10b based on voltages supplied to the terminals VH, VL, and GND.

The control circuit 21 calculates a voltage difference between the battery cells based on the voltages measured at the battery cells 10a and 10b to determine the cell balance between the battery cells. When it is determined that the cell balance has been lost, the circuit controls the control switch 22a or 22b which will be described later to perform a leveling process, i.e., a process of discharging the battery cell having the higher voltage to level the voltages of the battery cells 10a and 10b. Depending on the result of the leveling process, the charge control signal and the discharge control signal for controlling the charge control FET 11a and the discharge control FET 12a provided at the switch circuit 5 are output to the terminals OC and OD.

When the charge control FET 11a and the discharge control FET 12a are turned off, the control circuit 21 provides the memory 24, which will be described later, with information indicating that the FETs have been turned off to temporarily inhibit charging and discharging of the secondary battery 2 (the information may be hereinafter referred to as "charge/discharge inhibition information").

The control circuit 21 outputs an interruption control signal for controlling the interruption circuit 4 to the terminal FU based on information stored in the memory 24.

The control switches 22a and 22b are turned on/off under control exercised by the control circuit 21. The control switches 22a and 22b are controlled such that they are normally off and such that they are turned on when the cell balance between the battery cells is lost. For example, when the voltage of the battery cell 10a is higher than the voltage of the battery cell 10b, the control switch 22a is turned on. As a result, a path is formed to allow a current to flow between the terminals VH and VL. Thus, the battery cell 10a can be discharged using a discharging load provided at the capacity counter 23a which will be described later. When the voltage of the battery cell 10b is higher than the voltage of the battery cell 10a, the control switch 22b is turned on. As a result, a path is formed to allow a current to flow between the terminals VH and GND. Thus, the battery cell 10b can be discharged using a discharging load provided at the capacity counter 23b.

Although not shown, the capacity counter 23a includes a discharging load and a discharged amount detecting circuit. When the control switch 22a is turned on, the battery cell 10a is discharged using the discharging load to decrease the voltage of the same. The discharged amount detecting circuit detects the current flowing through the discharging load and multiplies the detected current by the time over which the current flows to calculate the amount of electricity discharged. The capacity counter 23b includes a discharging load and a discharged amount detecting circuit similarly to the capacity counter 23a. When the control switch 22b is turned on, the battery cell 10b is discharged using the discharging load to decrease the voltage of the same, and the amount of discharge is calculated by the discharged amount detecting circuit. Information indicating the amounts of discharge calculated by the capacity counters 23a and 23b (the information may be hereinafter referred to as "discharged amount information") is supplied to the memory 24.

The memory 24 is a non-volatile memory such as an EEPROM (electrically erasable and programmable read only memory). Information indicating a count of temporary inhibitions of charging and discharging of the secondary battery 2 based on the charge/discharge inhibition information supplied from the control circuit 21 (the information may be hereinafter referred to as "charge/discharge inhibition record") is stored in the memory 24. The charge/discharge inhibition record is updated each time charge/discharge inhibition information is supplied from the control circuit 21.

Information indicating a total value of amounts of discharge measured by the capacity counter 23a or 23b during a series of leveling processes (hereinafter referred to as "total discharge amount information") is also stored in the memory 24. The total discharge amount information is updated each time discharged amount information is supplied from the capacity counter 23a or 23b. The charge/discharge inhibition record and the total discharge amount information is read out upon request from the control circuit 21 and supplied to the control circuit 21.

Although it has been described above that the features of the control section 3 in this example are incorporated in an IC, the invention is not limited to the example, and each of the features may be independently provided outside the IC.

[Operations of Battery Pack]

In the battery pack 1 of the present embodiment, the state of cell balance between the battery cells is determined, and a leveling process is performed to achieve a proper cell balance according to the result of the determination. When a proper cell balance is not achieved as a result of the leveling process, a process of temporarily or permanently inhibiting charging and discharging is performed. Each of the processes performed at the battery pack 1 will be specifically described below.

In the following description, the battery cell 10a or 10b, the control switch 22a or 22b, and the capacity counter 23a or 23b will be simply referred to as "battery cell 10", "control switch 22", and "capacity counter 23", respectively, when there is no need for discriminating those elements using the suffixes.

First, the control circuit 21 performs the process of determining the state of cell balance between the battery cells 10a and 10b based on the voltages V1 and V2 of the respective battery cells 10a and 10b. The control circuit 21 measures the voltages V1 and V2 of the battery cells 10a and 10b based on voltages $V_{VH}$, $V_{VL}$, and $V_{GND}$ supplied to the terminals VH, VL, and GND of the control section 3, respectively.

In this example, the two battery cells 10a and 10b are connected in series. Therefore, the voltage V1 of the battery cell 10a is calculated according to Expression 1 using the voltage $V_{vH}$ at the terminal VH and the voltage $V_{VL}$ at the terminal VL. The voltage V2 of the battery cell 10b is calculated according to Expression 2 using the voltage $V_{vL}$ at the terminal VL and the voltage $V_{GND}$ at the terminal GND. Since the voltage $V_{GND}$ at the terminal GND is substantially 0 [V], the voltage $V_{VL}$ at the terminal VL may be considered to constitute the voltage V2 of the battery cell 10*b* as it is.

$$V1 = V_{VH} - V_{VL} \quad \text{Expression 1}$$

$$V2 = V_{VL} - V_{GND} (\approx V_{VL}) \quad \text{Expression 2}$$

The state of cell balance between the battery cells can be determined based on a voltage difference between the battery cells. The control circuit 21 calculates an absolute value |V1−V2| of the voltage difference based on calculated voltages V1 and V2 of the respective battery cells 10*a* and 10*b* to determine the state of cell balance between the battery cells.

In the present embodiment of the invention, a predetermined threshold (which is represented by A [V], for example) is set for the voltage difference absolute value |V1−V2| in advance. The threshold A is a value for determining whether there is a proper cell balance between the battery cells. The state of cell balance can be determined by checking whether the relationship between the voltage difference absolute value |V1−V2| and the threshold A satisfies Expression 3 shown below or not.

$$|V1-V2| > A \quad \text{Expression 3}$$

When Expression 3 is satisfied, i.e., when the voltage difference absolute value |V1−V2| is in the excess of the threshold A, it is determined that the cell balance between the battery cells 10*a* and 10*b* has been lost. When Expression 3 is not satisfied, i.e., when the voltage difference absolute value |V1−V2| is equal to or smaller than the threshold A, there is a proper cell balance between the battery cells 10*a* and 10*b*.

When it is determined that cell balance has been lost as a result of the above-described determination process, the control circuit 21 performs the leveling process for achieving a proper cell balance. The control circuit 21 controls the control switch 22 associated with the battery cell 10, i.e., either the battery cell 10*a* or 10*b*, which has the higher voltage to discharge the battery cell 10 such that the voltage difference between the battery cell and the other battery cell 10 becomes equal to or smaller than the threshold A.

For example, when the voltage V1 of the battery cell 10*a* is higher than the voltage V2 of the battery cell 10*b*, the control circuit 21 exercises control such that the control switch 22*a* is turned on to discharge the battery cell 10*a*. At this time, the capacity counter 23*a* measures the amount of electricity discharged from the battery cell 10*a* and supplies discharged amount information indicating the measured amount of discharged electricity to the memory 24.

For example, when the voltage V2 of the battery cell 10*b* is higher than the voltage V1 of the battery cell 10*a*, the control circuit 21 exercises control such that the control switch 22*b* is turned on to discharge the battery cell 10*b*. At this time, the capacity counter 23*b* measures the amount of discharge from the battery cell 10*b* and supplies discharged amount information indicating the measured amount of discharge to the memory 24.

The control circuit 21 reads total discharge amount information stored in the memory 24 and adds the amount of discharge indicated by the discharged amount information thus supplied to a total value of amounts of discharge indicated by the total discharge amount information, thereby updating the total discharge amount information. The updated total discharge amount information is stored in the memory 24.

When the absolute value |V1−V2| of the voltage difference between the battery cells 10*a* and 10*b* becomes equal to or smaller than the threshold A as a result of the leveling process for achieving a proper cell balance, the control circuit 21 exercises control to turn off the control switch 22 associated with the battery cell 10 which has been discharged, thereby terminating the discharge of the battery cell 10.

In this embodiment, a threshold C1 for determining the safety of the battery pack 1 is provided in association with the total discharge amount value stored in the memory 24. It is determined whether the level of safety of the battery pack 1 has become low or not based on the relationship between the total discharge amount value and the threshold C1. The control circuit 21 reads the total discharge amount information stored in the memory 24 and compares the total discharge amount value indicated by the total discharge amount information with the threshold C1. When the total discharge amount value is in the excess of the threshold C1 as a result of the comparison, it is determined that the cells have become significantly imbalanced to reduce the level of safety of the battery pack 1.

When the total discharge amount value is equal to or smaller than the threshold C1, the control circuit 21 continues the leveling process until a proper cell balance is achieved between the battery cells 10*a* and 10*b* or until the total discharge amount value exceeds the threshold C1.

When the total discharge amount value exceeds the threshold C1, the control circuit 21 outputs a charge control signal and a discharge control signal to the switch circuit 5 to exercise control such that the charge control FET 11*a* and the discharge control FET 11*b* are turned off, whereby charging and discharging of the secondary batter 2 is temporarily inhibited. The following description include some simplified expressions such as a sentence reading "the charge/discharge control FETs 11*a* and 12*a* are turned on/off" which stands for a sentence reading "the charge control FET 11*a* and the discharge control FET 12*a* provided in the switch circuit 5 are turned on/off".

When charging and discharging of the secondary battery 2 is temporarily inhibited by turning the charge/discharge control FETs 11*a* and 12*b* off, the control circuit 21 supplies charge/discharge inhibition information indicating that charging and discharging has been temporarily inhibited to the memory 24. A value indicating a count of temporary inhibitions of charging and discharging stored in the memory as the charge/discharge inhibition record is incremented to update the charge/discharge inhibition information, and the updated information is stored in the memory 24.

The above-described leveling process for achieving a proper cell balance is performed even while charging and discharging is temporarily inhibited. When the absolute value |V1−V2| of the voltage difference between the battery cells 10*a* and 10*b* becomes equal to or smaller than the threshold A as a result of a leveling process performed while charging and discharging is inhibited, the control circuit 21 determines that a proper cell balance has been achieved between the battery cells 10*a* and 10*b*. In this case, the control circuit 21 outputs a charge control signal and a discharge control signal to the switch circuit 5 to exercise control such that the charge/discharge control FETs 11*a* and 11*b* are turned on. Thus, the charging and discharge inhibition is cancelled to enable charging and discharging.

In this embodiment, a threshold C2 for determining the safety of the battery pack 1 is provided in association with a total discharge amount value stored in the memory 24. It is determined whether the level of safety of the battery pack 1 has become lower or not based on a relationship between the threshold C2 and a total value of amounts of discharge from either battery cell 10 as a result of leveling processes for achieving a proper cell balance performed during temporary inhibition of charging and discharging.

The control circuit 21 reads total discharge amount information stored in the memory 24 and compares a total discharge amount value indicated by the total discharge amount information with the threshold C2. When the total discharge amount value is in the excess of the threshold C2 as a result of the comparison, it is determined that the cells have become significantly imbalanced to reduce the level of safety of the battery pack 1.

When the total discharge amount value is equal to or smaller than the threshold C2, the control circuit 21 continues the leveling process until a proper cell balance is achieved between the battery cells 10a and 10b or until the total discharge amount value exceeds the threshold C2.

As described above, in this embodiment, charging and discharging of the secondary battery 2 is temporarily inhibited when a proper cell balance is not achieved even after the threshold C1 is exceeded by the value of amounts of electricity discharged from the secondary battery 2 during leveling processes for achieving a proper cell balance. When a proper cell balance is achieved during the temporary inhibition of charging and discharging, the temporary charge/discharge inhibition is canceled to enable charging and discharging.

However, when the level of safety of the battery pack 1 is significantly low, even if a proper cell balance is once achieved by the leveling process, the cell balance may be lost again. In such a case, the battery pack will repeatedly enter the state in which charging and discharging is temporarily inhibited and the state in which charging and discharging is enabled.

In the present embodiment, a threshold N for determining the safety of the battery pack 1 is provided, and the threshold N is compared with a count of temporary charge/discharge inhibitions represented by a charge/discharge inhibition record stored in the memory 24. Depending on the result of the comparison, charging and discharging of the secondary battery 2 may be permanently inhibited to prevent the use of the battery pack 1 when the battery pack is at a significantly low level of safety.

The control circuit 21 reads the charge/discharge inhibition record stored in the memory 24 and compares a count of temporary charge/discharge inhibitions represented by the charge/discharge inhibition record with the threshold N. When the count of temporary charge/discharge inhibitions is in the excess of the threshold N, it is determined that the battery pack 1 is at a significantly low level of safety.

In this case, the control circuit 21 outputs an interruption control signal to the interruption circuit 4 to exercise control such that the switch element 15 provided in the interruption circuit 4 is turned on. When the switch element 15 of the interruption circuit 4 is turned on, a path is formed to allow a current to flow through the heater resistor 14. The fuses 13 are blown by heat generated at the heater resistor 14, and paths for charging and discharging the secondary battery 2 are consequently interrupted to inhibit charging and discharging permanently.

When the count of temporary charge/discharge inhibitions is equal to or smaller than the threshold N, the control circuit 21 continues the leveling process to achieve a proper cell balance.

Operations of the battery pack 1 will now be described based on more specific instances. The instances will be descried based on an assumption that deterioration of the battery cell 10b has proceeded more rapidly than that of the battery cell 10a, i.e., the voltage V1 of the battery cell 10a is higher than the voltage V2 of the battery cell 10b. The following four exemplary instances will be described.

1. Instance in which temporary charge/discharge inhibition is repeated plural times 2. Instance in which a proper cell balance is achieved as a result of a leveling process 3. Instance in which a proper cell balance is achieved by a leveling process performed during temporal charge/discharge inhibition 4. Instance in which a proper cell balance is not achieved by a leveling process performed during temporal charge/discharge inhibition 1. Instance in which Temporary Charge/Discharge Inhibition is Repeated Plural Times When it is determined based on Expression 3 that the battery cells 10a and 10b have become imbalanced, the control circuit 21 performs a leveling process to achieve a proper cell balance, the process involving turning the control switch 22a on to discharge the battery cell 10a. The capacity counter 23a measures the amount of electricity discharged from the battery cell 10a and supplies discharged amount information obtained as a result of the measurement to the memory 24. The control circuit 21 updates total discharge amount information in the memory 24 based on the discharged amount information supplied to the same.

Next, the control circuit 21 compares a total discharge amount value indicated by the total discharge amount information stored in the memory 24 with the threshold C1. In this instance, a proper cell balance is not achieved between the battery cells 10a and 10b, and the total discharge amount value is in the excess of the threshold C1. Therefore, the control circuit 21 exercises control such that the charge/discharge FETs 11a and 11b are turned off to inhibit charging and discharging of the secondary batter 2 temporarily. The control circuit 21 supplies charge/discharge inhibition information to the memory 24 to update the charge/discharge inhibition record.

Next, the control circuit 21 compares a count of temporary charge/discharge inhibitions indicated by the charge/discharge inhibition record stored in the memory 24 with the threshold N. In this instance, the count of temporary charge/discharge inhibitions is in the excess of the threshold N. Therefore, the control circuit 21 exercises control such that the switch element 15 of the interruption circuit 4 is turned on. A path is formed in the interruption circuit 4 to allow a current to flow through the heater resistor 14 under control exercised by the control circuit 21, and the fuses 13 are blown by heat generated at the heater resistor 14. Thus, charging and discharging of the secondary battery 2 is permanently inhibited.

2. Instance in which a Proper Cell Balance is Achieved as a Result of a Leveling Process When it is determined based on Expression 3 that the battery cells 10a and 10b have become imbalanced, the control circuit 21 performs a leveling process to achieve a proper cell balance, the process involving turning the control switch 22a on to discharge the battery cell 10a. The capacity counter 23a measures the amount of electricity discharged from the battery cell 10a and supplies discharged amount information obtained as a result of the measurement to the memory 24. The control circuit 21 updates total discharge amount information in the memory 24 based on the discharged amount information supplied to the same.

Next, the control circuit 21 determines the state of cell balance between the battery cells 10a and 10b using Expression 3. In this instance, a proper cell balance is achieved by the leveling process, and Expression 3 not satisfied. Therefore, the control circuit 21 exercises control to turn the control switch 22a off, and the discharge of the battery cell 10a is consequently terminated to end the leveling process.

3. Instance in which a Proper Cell Balance is Achieved by a Leveling Process Performed During Temporal Charge/Discharge Inhibition When it is determined based on Expression 3 that the battery cells 10a and 10b have become imbalanced, the control circuit 21 performs a leveling process to achieve a proper cell balance, the process involving turning the control switch 22a on to discharge the battery cell 10a. The capacity counter 23a measures the amount of electricity discharged from the battery cell 10a and supplies discharged amount information obtained as a result of the measurement to the memory 24. The control circuit 21 updates total discharge amount information in the memory 24 based on the discharged amount information supplied to the same.

Next, the control circuit 21 compares a total discharge amount value indicated by the total discharge amount information stored in the memory 24 with the threshold C1. In this instance, a proper cell balance is not achieved between the battery cells 10a and 10b, and the total discharge amount value is in the excess of the threshold C1. Therefore, the control circuit 21 exercises control such that the charge/discharge FETs 11a and 11b are turned off to inhibit charging and discharging of the secondary batter 2 temporarily. The control circuit 21 supplies charge/discharge inhibition information to the memory 24 to update the charge/discharge inhibition record.

Next, the control circuit 21 compares a count of temporary charge/discharge inhibitions indicated by the charge/discharge inhibition record stored in the memory 24 with the threshold N. In this instance, the count of temporary charge/discharge inhibitions is not in the excess of the threshold N. Therefore, the leveling process is continued. The capacity counter 23a measures the amount of electricity discharged from the battery cell 10a, and supplies charged amount information obtained by the measurement to the memory 24. The control circuit 21 updates the total discharge amount information in the memory 24 based on the discharged amount information supplied to the same.

Next, the control circuit 21 determines the state of cell balance between the battery cells 10a and 10b using Expression 3. In this instance, a proper cell balance is achieved as a result of the leveling process performed while charging and discharging is inhibited, and Expression 3 is not satisfied. Therefore, the control circuit 21 exercises control to turn the control switch 22a off, and the discharge of the battery cell 10a is consequently terminated to end the leveling process. The control circuit 21 also exercises control to turn the charge/discharge control FETs 11a and 12a on to cancel the temporary inhibition of charging and discharging of the secondary battery 2.

4. Instance in which a Proper Cell Balance is not Achieved by a Leveling Process Performed During Temporal Charge/Discharge Inhibition When it is determined based on Expression 3 that the battery cells 10a and 10b have become imbalanced, the control circuit 21 performs a leveling process to achieve a proper cell balance, the process involving turning the control switch 22a on to discharge the battery cell 10a. The capacity counter 23a measures the amount of electricity discharged from the battery cell 10a and supplies discharged amount information obtained as a result of the measurement to the memory 24. The control circuit 21 updates total discharge amount information in the memory 24 based on the discharged amount information supplied to the same.

Next, the control circuit 21 compares a total discharge amount value indicated by the total discharge amount information stored in the memory 24 with the threshold C1. In this instance, a proper cell balance is not achieved between the battery cells 10a and 10b, and the total discharge amount value is in the excess of the threshold C1. Therefore, the control circuit 21 exercises control such that the charge/discharge FETs 11a and 11b are turned off to inhibit charging and discharging of the secondary batter 2 temporarily. The control circuit 21 supplies charge/discharge inhibition information to the memory 24 to update the charge/discharge inhibition record.

Next, the control circuit 21 compares a count of temporary charge/discharge inhibitions indicated by the charge/discharge inhibition record stored in the memory 24 with the threshold N. In this instance, the count of temporary charge/discharge inhibitions is not in the excess of the threshold N. Therefore, the leveling process is continued. The capacity counter 23a measures the amount of electricity discharged from the battery cell 10a, and supplies charged amount information obtained by the measurement to the memory 24. The control circuit 21 updates the total discharge amount information in the memory 24 based on the discharged amount information supplied to the same.

Next, the control circuit 21 compares a total discharge amount value indicated by the total discharge amount information stored in the memory 24 with the threshold C2. In this instance, a proper cell balance is not achieved between the battery cells 10a and 10b, and the total discharge amount value is in the excess of the threshold C2. Therefore, the control circuit 21 exercises control to turn on the switch element 15 of the interruption circuit 4. A path is formed in the interruption circuit 4 to allow a current to flow through the heater resistor 14 under control exercised by the control circuit 21, and the fuses 13 are blown by heat generated at the heater resistor 14. Thus, charging and discharging of the secondary battery 2 is permanently inhibited.

Figure 4:
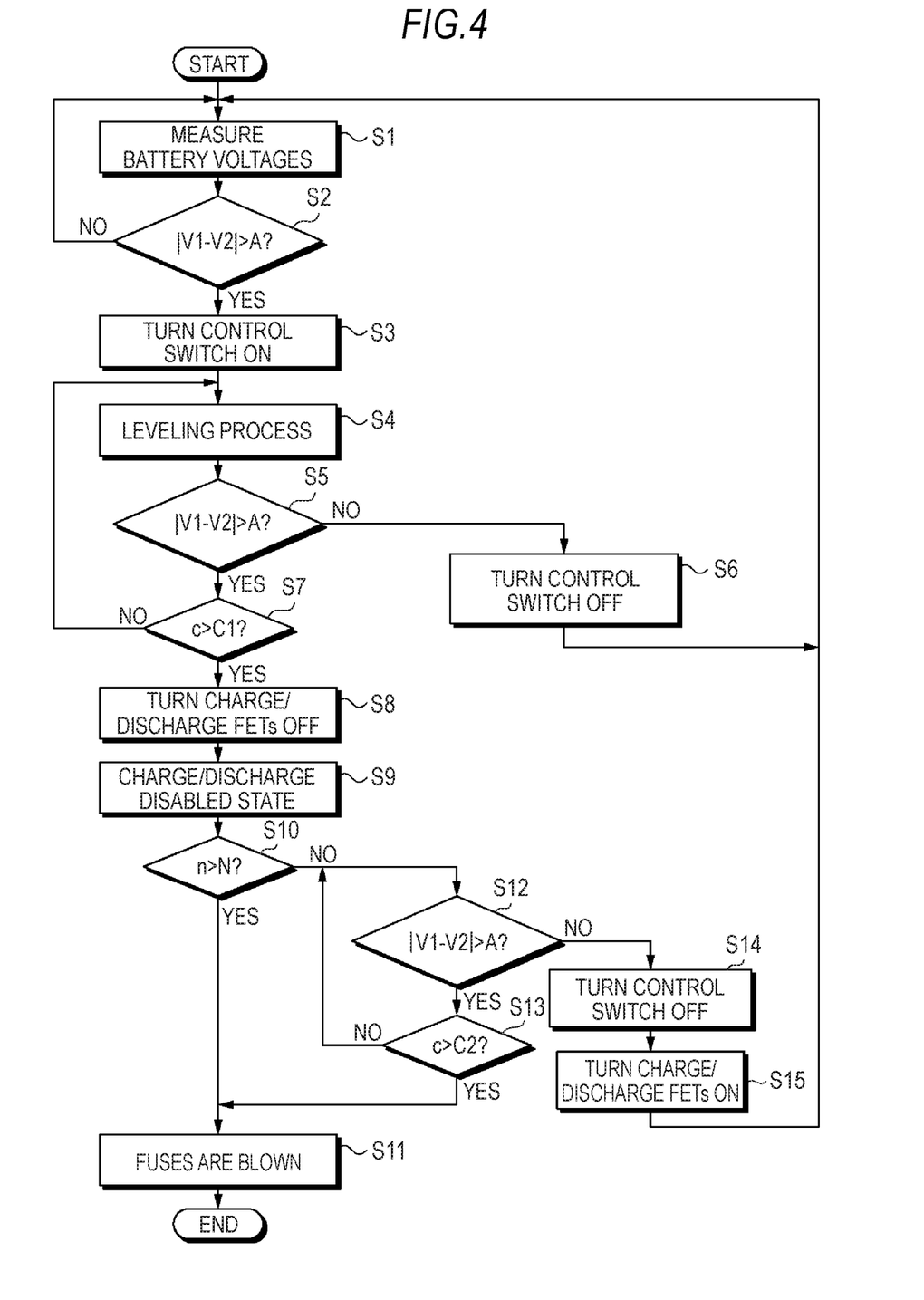
FIG. 4 is a flow chart for explaining a flow of steps for controlling charging and discharging of a secondary battery according to the embodiment.

A description will now be made with reference to the flow chart shown in FIG. 4 on a flow of processes for controlling charging and discharging of the secondary battery 2 which can be used in this embodiment of the invention. The processes described below are carried out under control exercised by the control circuit 21 unless otherwise specified. The following processes are cyclically carried out at predetermined time intervals.

At step S1, the voltages V1 and V2 of the respective battery cells 10a and 10b are measured according to Expressions 1 and 2 described above using voltages $V_{VH}$, $V_{VL}$, and $V_{GND}$ supplied to the terminals VH, VL, and GND of the control section 3.

At step S2, a voltage difference absolute value |V1−V2| is calculated from the voltages V1 and V2 of the battery cells 10a and 10b calculated at step S1, and it is compared with the threshold A as shown in Expression 3. When the voltage difference absolute value |V1−V2| is in the excess of the threshold A as a result of the comparison, it is determined that the cell balance between the battery cells 10a and 10b has been lost, and the process proceeds to step S3. When the voltage difference absolute value |V1−V2| is equal to or smaller than the threshold A, it is determined that there is a proper cell balance, and the process returns to step S1.

At step S3, the control switch 22 associated with the battery cell 10, i.e., the battery cell 10a or 10b, which has the higher voltage is turned on under control exercised by the control circuit 21. At step S4, the battery cell having the higher voltage is discharged. That is, a leveling process is performed to achieve a proper cell balance. At this time, the discharged capacity is measured by the capacity counter 23 associated with the battery cell 10 which is being discharged, and discharged capacity information indicating the discharged capacity value thus measured is supplied to the memory 24. The total discharged capacity information is updated based on the discharged capacity information supplied to the memory 24.

At step S5, the absolute value |V1−V2| of the voltage difference between the battery cells 10a and 10b is compared with the threshold A again. When the voltage difference absolute value |V1−V2| is equal to or smaller than the threshold A, it is determined that a proper cell balance has been achieved between the battery cells 10a and 10b. Then, the control switch 22 is turned off at step S6 to terminate the leveling process to achieve a proper cell balance.

When the voltage difference absolute value |V1−V2| is in the excess of the threshold A at step S5, it is determined that the cells are imbalanced, and the process proceeds to step S7.

At step S7, the total discharged capacity information stored in the memory 24 is read out, and the value of the total discharged capacity after the leveling process for achieving a proper cell balance is compared with the threshold C1. When the total discharged capacity value is in the excess of the threshold C1 as a result of the comparison, it is determined that the safety of the battery pack 1 has become low, and the process proceeds to step S8. When the total discharged capacity value is equal to or smaller than the threshold C1, the process returns to step S4.

At step S8, the charge control FET 11a and the discharge control FET 12a are turned off by a charge control signal and a discharge control signal output from the control circuit 21 through the terminals OC and OD of the control section 3. At this time, charge/discharge inhibition information indicating that charging and discharging has been temporarily inhibited is supplied from the control circuit 21 to the memory 24. The charge/discharge inhibition record is updated based on the charge/discharge inhibition information supplied to the memory 24.

At step S9, charging and discharging of the secondary battery 2 is temporarily inhibited because the charge control FET 11a and the discharge control FET 12a are turned off at step S8.

At step S10, the charge/discharge inhibition record stored in the memory 24 is read out, and a count of temporary charge/discharge inhibitions indicated by the charge/discharge inhibition record is compared with the threshold N. When the count of temporary charge/discharge inhibitions is in the excess of the threshold N as a result of the comparison, the fuses 13 of the interruption circuit 4 are forcibly blown by an interruption control signal output from the control circuit 21 through the terminal FU. Thus, charging and discharging of the secondary battery 2 is permanently inhibited, and the series of steps is terminated.

When the count of charge/discharge inhibitions is equal to or smaller than the threshold N at step S10, the process proceeds to step S12.

At step S12, the absolute value |V1−V2| of the voltage difference between the battery cells 10a and 10b is compared with the threshold A again. When the voltage difference absolute value |V1−V2| is equal to or smaller than the threshold A, it is determined that a proper cell balance has been achieved between the battery cells 10a and 10b. Then, the control switch 22 is turned off to terminate the discharging of the battery cell 10 at step S14. The charge and discharge control FETs 11a and 12a are turned on at step S15 to enable charging and discharging of the secondary battery 2. The process then returns to step S1.

When the voltage difference absolute value |V1−V2| is in the excess of the threshold A at step S12, it is determined that the cells are imbalanced, and the process proceeds to step S13.

At step S13, the total discharged capacity information stored in the memory 24 is read out, and a total discharged capacity value indicated by the information is compared with the threshold C2. When the total discharged capacity value is in the excess of the threshold C2 as a result of the comparison, it is determined that the safety of the battery pack 1 has become low. Then, the process proceeds to step S11 at which the fuses 13 of the interruption circuit 4 are forcibly blown to inhibit charging and discharging of the secondary battery 2 permanently. When the total discharged capacity value is equal to or smaller than the threshold C2, the process returns to step S12.

As thus described, in the present embodiment of the invention, the total amount of electricity discharged at a leveling process is stored, and it is determined that the safety of the battery pack has become low when the total amount of discharged electricity is in the excess of a predetermined value. Then, charging and discharging of the secondary battery is temporarily inhibited. The number of times charging and discharging of the secondary battery has been inhibited is stored, and it is determined that the safety of the battery pack has become significantly low when the count of temporary charge/discharge inhibitions exceeds a predetermined count. Then, charging and discharging of the secondary battery is permanently inhibited. It is therefore possible to avoid a dangerous situation even when a user continues to use a battery pack without recognizing that the safety of the battery pack has become low.

The embodiment of the invention has been described above, but the invention is not limited to the above-described embodiment, and various modifications and applications of the invention may be made without departing from the spirit of the invention. For example, while the embodiment has been described as an instance in which two battery cells 10a and 10b are connected in series, the invention is not limited to such an embodiment and may be applied to instances in which three or more battery cells are used.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A battery pack comprising:
   a secondary battery formed by connecting a plurality of battery cells in series;
   a control section measuring a voltage at each of the plurality of battery cells and controlling each part according to the result of the measurement;
   a charge/discharge control circuit temporarily inhibiting charging and discharging of the secondary battery under control exercised by the control section;
   an interruption circuit interrupting charge and discharge currents of the secondary battery under control exercised by the control section to inhibit charging and discharging of the secondary battery permanently;
   a discharge circuit discharging a predetermined battery cell among the plurality of battery cells under control exercised by the control section;

a capacity measuring section measuring the amount of electricity discharged from the battery cell at the discharge circuit; and a storage section storing total discharge amount information indicating a total amount of discharged electricity measured by the capacity measuring section and a charge/discharge inhibition record indicating a count of temporary charge/discharge inhibitions imposed on the secondary battery by the charge/discharge control circuit, wherein first and second thresholds for determining the safety of the secondary battery are set in association with the value of the total amount of discharged electricity indicated by the total discharge amount information and the count of temporary charge/discharge inhibitions indicated by the charge/discharge inhibition record;

the control section determines the state of cell balance between the plurality of battery cells based on the result of the measurement, performs a leveling process to achieve a proper cell balance by controlling the discharge circuit to discharge a battery cell having a high voltage among the plurality of battery cells when it is determined that the cell balance has been lost, and updates the total discharge amount information based on the amount of discharged electricity measured by the capacity measuring section, the control section compares the total amount of discharged electricity indicated by the total discharge amount information stored in the storage section with the first threshold, controls the charge/discharge control circuit to inhibit charging and discharging of the secondary battery temporarily when it is determined that the total amount of discharged electricity is in the excess of the first threshold as a result of the comparison, and updates the charge/discharge inhibition record; and the control section compares the count of temporary charge/discharge inhibitions indicated by the charge/discharge inhibition record stored in the storage section with the second threshold and controls the interruption circuit to inhibit charging and discharging of the secondary battery permanently when it is determined that the count of temporary charge/discharge inhibitions is in the excess of the second threshold as a result of the comparison.

2. A battery pack according to claim 1, wherein the control section controls the discharge circuit to terminate the leveling process when it is determined that a proper cell balance has been achieved by the leveling process.

3. A battery pack according to claim 1, wherein the control section continues the leveling process when the value of the total amount of discharged electricity is equal to or smaller than the first threshold as a result of the comparison between the value of total amount of discharged electricity and the first threshold.

4. A battery pack according to claim 1, wherein a third threshold for determining the safety of the secondary battery is set in association with the value of the total amount of discharged electricity;

the control section determines the state of cell balance again when it is determined that the count of temporary charge/discharge inhibitions is equal to or smaller than the second threshold as a result of the comparison between the count of temporary charge/discharge inhibitions and the second threshold;

the control section continues the leveling process when it is determined that the cells are imbalanced as a result of the determination; and the control section controls the interruption circuit to inhibit charging and discharging of the secondary battery permanently when it is determined that the value of the total amount of discharged electricity is in the excess of the third threshold as a result of the comparison between the value of the total amount of discharged electricity and the third threshold.

5. A battery pack according to claim 4, wherein the control circuit controls the discharge circuit to terminate the leveling process and controls the charge/discharge control circuit to cancel the temporary charge/discharge inhibition when it is determined that a proper cell balance have been achieved as a result of the determination of the state of cell balance.

6. A battery pack according to claim 4, wherein the control section continues the leveling process when it is determined that the value of the total amount of discharged electricity is equal to or smaller than the third threshold as a result of the comparison between the value of the total amount of discharged electricity and the third threshold.

7. A control method comprising:

measuring a voltage at each of a plurality of series-connected battery cells of a secondary battery and controlling each part according to the result of the measurement;

measuring the amount of electricity discharged from a predetermined battery cell among the plurality of battery cells through a discharge circuit for discharging the battery cells;

storing total discharge amount information indicating a total amount of discharged electricity measured by at the capacity measuring step and a charge/discharge inhibition record indicating a count of temporary charge/discharge inhibitions imposed on the secondary battery by a charge/discharge control circuit for temporarily inhibiting charging and discharging of the secondary battery in a storage section, wherein first and second thresholds for determining the safety of the secondary battery are set in association with the value of the total amount of discharged electricity indicated by the total discharge amount information and the count of temporary charge/discharge inhibitions indicated by the charge/discharge inhibition record; and the control step includes the steps of determining the state of cell balance between the plurality of battery cells based on the result of the measurement, performing a leveling process to achieve a proper cell balance by controlling the discharge circuit to discharge a battery cell having a high voltage among the plurality of battery cells when it is determined that the cell balance has been lost, and updating the total discharge amount information based on the amount of discharged electricity measured at the capacity measuring step, comparing the total amount of discharged electricity indicated by the total discharge amount information stored in the storage section with the first threshold, controlling the charge/discharge control circuit to inhibit charging and discharging of the secondary battery temporarily when it is determined that the total amount of discharged electricity is in the excess of the first threshold as a result of the comparison, and updating the charge/discharge inhibition record; and comparing the count of temporary charge/discharge inhibitions indicated by the charge/discharge inhibition record stored in the storage section with the second threshold and permanently inhibiting charging and discharging of the secondary battery by controlling an interruption circuit which interrupts charge and discharge currents of the secondary battery to inhibit charging and discharging of the secondary battery permanently, when it is determined that the count of temporary charge/discharge inhibitions is in the excess of the second threshold as a result of the comparison.

* * * * *